(12) United States Patent
Giovannini et al.

(10) Patent No.: US 11,453,151 B2
(45) Date of Patent: Sep. 27, 2022

(54) DEVICES FOR FORMING COMPONENTS HAVING CAVITIES

(71) Applicant: Guala Closures S.p.A., Frazione Spinetta Marengo (IT)

(72) Inventors: Marco Giovannini, Luxembourg (LU); Luca Viale, Alessandria (IT)

(73) Assignee: GUALA CLOSURES S.p.A., Frazione Spinetta Marengo (IT)

( * ) Notice: Subject to any disclaimer, the term of this patent is extended or adjusted under 35 U.S.C. 154(b) by 0 days.

(21) Appl. No.: 17/044,700

(22) PCT Filed: Apr. 3, 2019

(86) PCT No.: PCT/IB2019/052728
§ 371 (c)(1),
(2) Date: Oct. 1, 2020

(87) PCT Pub. No.: WO2019/193515
PCT Pub. Date: Oct. 10, 2019

(65) Prior Publication Data
US 2021/0146586 A1  May 20, 2021

(30) Foreign Application Priority Data

Apr. 4, 2018  (IT) .................. 102018000004189

(51) Int. Cl.
*B29C 45/44* (2006.01)
(52) U.S. Cl.
CPC ................. *B29C 45/4421* (2013.01)
(58) Field of Classification Search
CPC .................................. B29C 45/4421
See application file for complete search history.

(56) References Cited

U.S. PATENT DOCUMENTS

| 3,266,100 A | 8/1966 | Belanger |
| 3,482,815 A | 12/1969 | Naturale |
| (Continued) | | |

FOREIGN PATENT DOCUMENTS

| DE | 1958838 A1 | 5/1971 |
| FR | 1394808 A | 4/1965 |
| (Continued) | | |

OTHER PUBLICATIONS

International Search Report and Written Opinion in corresponding International Application No. PCT/IB2019/052728 dated Jun. 21, 2019, 14 pages.

*Primary Examiner* — Galen H Hauth
(74) *Attorney, Agent, or Firm* — MH2 Technology Law Group LLP

(57) ABSTRACT

A device for electromagnetic forming of components having a cavity may include: a core extending along a central axis and configured to be fitted into the cavity to carry out a forming operation on a component; wherein the core may be configured to be pulled out of the cavity after the forming operation, wherein the core may include a plurality of segments in parallel arrangement, wherein the segments may be made of non-conductive material, and wherein the segments may be configured to alternate between a machining configuration, in which the segments are locked together to prepare the core for a machining operation, and an extraction configuration, in which the segments mutually slide to reduce a diameter of the core and to remove the core from the cavity; and drive means for moving the segments, wherein the drive means is configured to alternate the segments between the machining and extraction configurations.

17 Claims, 5 Drawing Sheets

(56) References Cited

U.S. PATENT DOCUMENTS

| | | |
|---|---|---|
| 3,704,978 A | 12/1972 | Leier et al. |
| 4,080,140 A | 3/1978 | Wilson et al. |
| 4,597,728 A | 7/1986 | McGlashen |
| 2009/0152770 A1* | 6/2009 | Mikac ................ B29C 45/4421 264/334 |

FOREIGN PATENT DOCUMENTS

| | | |
|---|---|---|
| GB | 2278801 A | 12/1994 |
| WO | 2016030894 A1 | 3/2016 |

* cited by examiner

DEVICES FOR FORMING COMPONENTS HAVING CAVITIES

CROSS-REFERENCE TO RELATED APPLICATION(S)

This application is a national stage entry from International Application No. PCT/IB2019/052728, filed on Apr. 3, 2019, in the Receiving Office ("RO/IB") of the International Bureau of the World Intellectual Property Organization ("WIPO"), and published as International Publication No. WO 2019/193515 Al on Oct. 10, 2019; International Application No. PCT/IB2019/052728 claims priority from Italian Patent Application No. 102018000004189, filed on Apr. 4, 2018, in the Italian Patent and Trademark Office ("IPTO"), the entire contents of all of which are incorporated herein by reference.

The present invention relates to a device for forming components having a cavity. Preferably, but without limitation, these components may be bottle closures. The forming operation may be of any type, e.g. injection molding, rolling, electromagnetic forming or else.

Devices for forming components having a cavity are known in the art. These devices comprise, for example, cores that are part of an injection mold, namely the part of the mold that will define the cavity of the component to be formed. If the component is a bottle closure, then the cavity defined by the core will be the internal cavity of the closure.

These cavities often have one or more undercuts formed therein. The presence of the undercuts prevents the core from being pulled out of the molded closure, whereby the core must be disassembled before removal.

The prior art suggests several solutions to this problem. In a first known arrangement, the core has a seat for receiving a mandrel. Once forming or molding has been completed, the mandrel is removed and the core is disassembled in multiple segments, which are individually pulled out of the cavity.

It will be understood that the aforementioned core pulling process is long and laborious. In an attempt to at least partially obviate this drawback, in certain prior art devices the core is defined by a plurality of segments, hinged to a base. These segments are arranged to rotate toward the seat once the mandrel has been removed.

SUMMARY OF THE INVENTION

Prior art devices have the drawback that the segments that compose the core cannot be displaced at the same time, but some of them must be removed first to make room for movement of the others. This will make the core pulling process long and laborious.

Therefore, the technical purpose of the present invention is to provide a device for forming components having a cavity that can obviate the above-mentioned prior art drawbacks.

In particular, the object of the present invention is to provide a device for forming components having a cavity that can simplify and expedite the core pulling process.

A further object of the present invention is to provide a device for forming components having a cavity that can pull out the core in one movement.

The aforementioned technical purpose and objects are substantially fulfilled by a device for forming components having a cavity that comprises the technical features as disclosed in one or more of the accompanying claims.

In particular, a device according to a first embodiment of the present invention is designed to be employed for forming components having a cavity. This cavity has a side wall and defines a longitudinal axis.

The device comprises a core that defines a center axis. This core is configured to fit into the cavity. Furthermore, the core is configured to be pulled out of the cavity after the forming operation.

More in detail, the core comprises a plurality of segments in mutually parallel arrangement. These segments are adapted to be alternated between a machining configuration and an extraction configuration. In the machining configuration, the segments are locked together to prepare the core for machining. In the extraction configuration, the segments are able to slide relative to each other to reduce the diameter of the core and pull it out of the cavity.

The device further comprises segment-driving means. These drive means are configured to move the segments at least from the machining configuration to the extraction configuration.

The present invention further relates to a use of the above discussed device in an electromagnetic forming process for forming a component having a cavity. Such use comprises the step of moving the segments to the machining configuration. Then, the component is electromagnetically formed on the core.

After electromagnetic forming, the segments are switched from the machining configuration to the extraction configuration. Then the core is pulled out of the cavity.

The device and use of the invention solve the above discussed technical problems. This is because the drive means allow segments to be moved in one movement, thereby making possible to automatically switch from the machining configuration to the extraction configuration and, as a result, obtaining a more efficient and quicker core pulling process.

LIST OF DRAWINGS

Further features and advantages of the present invention will result more clearly from the illustrative, non-limiting description of a preferred, non-exclusive embodiment of a device for forming components having a cavity, as shown in the annexed drawings, in which.

DETAILED DESCRIPTION

Referring to the accompanying figures, numeral 1 designates a device for forming components having a cavity, particular having a side wall and defining a longitudinal axis. This component is not shown in the annexed figures because it is not part of the present invention, but by way of example it may be a bottle closure or a part of it.

As used in the present description and in the annexed claims, the term "forming" is intended to designate a machining process that can produce a component from the starting material or change its shape. Merely by way of example, the term "forming" is intended to encompass molding processes, namely injection molding, rolling and electromagnetic forming.

Figure 1:
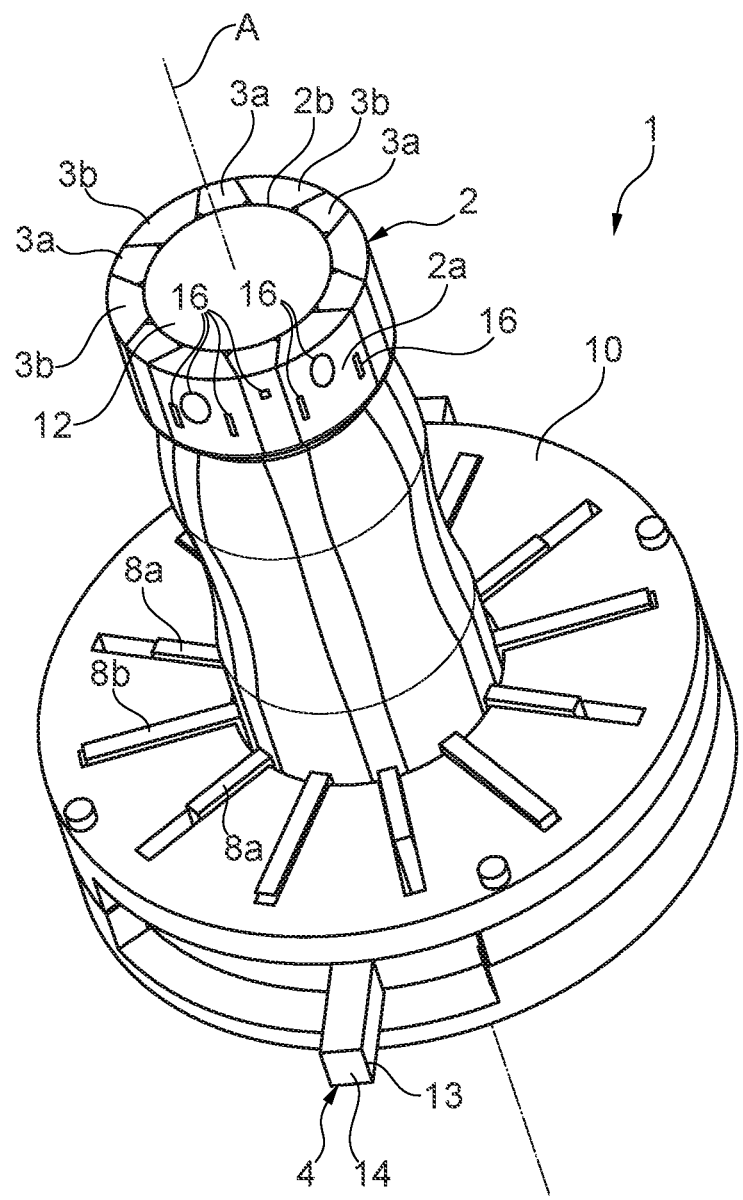
FIG. 1 is a perspective view of a device for forming components having a cavity according to the present invention.
Figure 2:
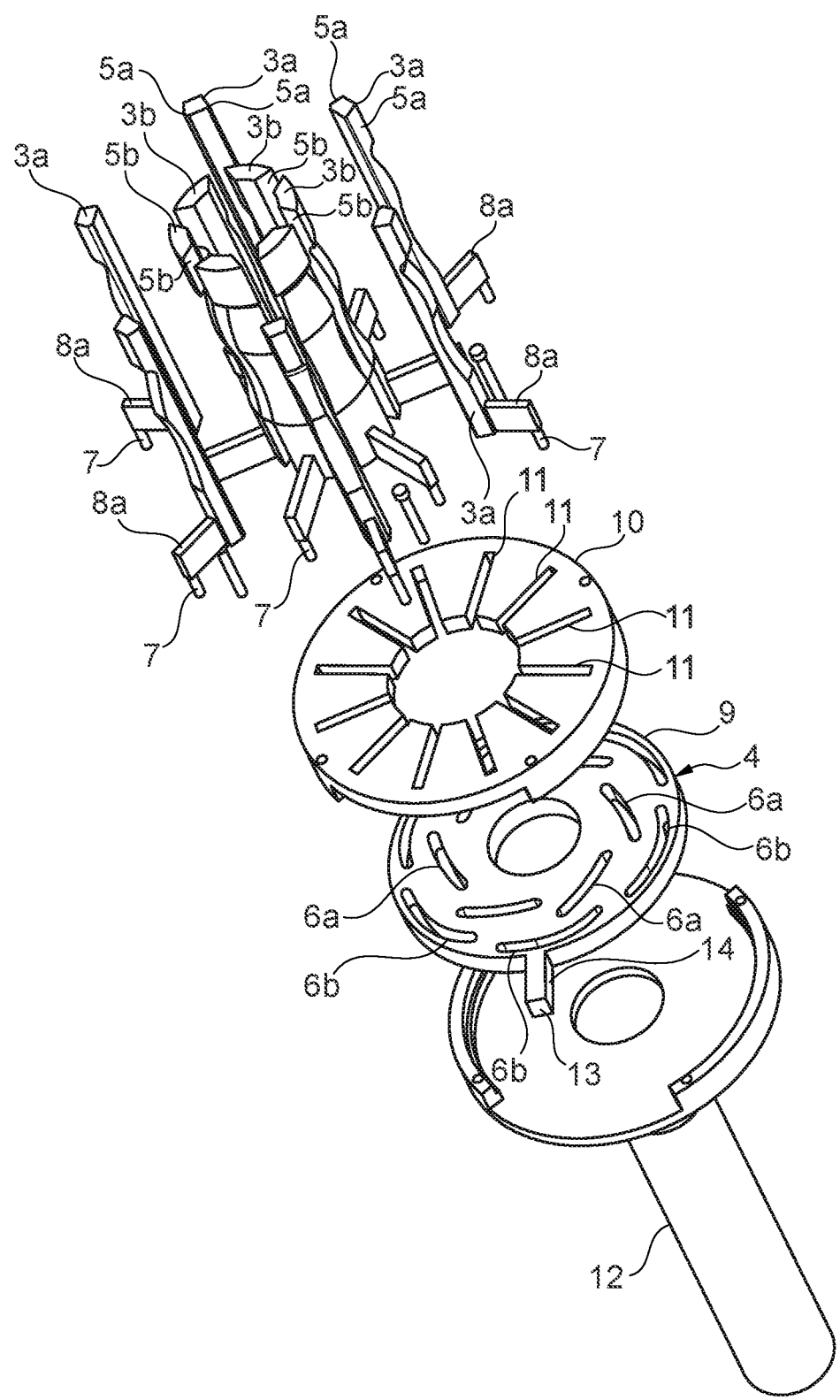
FIG. 2 is an exploded perspective view of the device of FIG. 1.

More in detail, the device 1 comprises a core 2. This core 2 extends along a center axis "A". In the preferred embodiment, the core 2 has an axially symmetric shape, particularly a prismatic and more particularly a cylindrical shape. More generally, the shape of the core 2 may be defined by a hollow solid of revolution, more particularly, as shown in FIG. 1, a solid of revolution having a circular cross section.

According to an alternative embodiment of the invention, not shown in the drawings, the core 2 may have a non-axially symmetric shape.

It shall be noted that the core 2 is arranged to fit into a cavity of the component that has to be electromagnetically formed. In certain machining processes, such as injection molding, the core 2 is not operably fitted into a cavity of the component, and the component is conversely formed around the core 2 such that, once machining has been completed, the core 2 will be in the cavity of the component that has been just produced. In any case, the core 2 is arranged to be pulled out of the cavity of the component.

More particularly, the core 2 has an outer lateral surface 2a. During forming, the outer lateral surface 2a imparts the shape to the component to be formed. For example, in electromagnetic forming, the magnetic fields push the metal component against the outer lateral surface 2a or, in injection molding, the outer lateral surface 2a directly contacts the polymeric material that has to be shaped. Advantageously, the outer lateral surface 2a of the core 2 may have one or more raised elements 16, such that these elements may be transferred to the component to be formed, by a technique commonly known as "embossing".

The core 2 further has a seat 2b defined by an inner surface 2c. The inner surface 2c surrounds the center axis "A" of the core 2, and is particularly symmetric with respect to it. A mandrel 12, which is known per se, is arranged to fit into the seat 2b, to stabilize the core 2 during machining.

More in detail, the core 2 comprises a plurality of segments 3a, 3b. These segments are in mutually parallel arrangement, and are particularly arranged parallel to the center axis "A" along which the core 2 extends. It shall be noted that each segment 3a, 3b at least partially defines the aforementioned outer lateral surface 2a of the core 2. Likewise, each segment 3a, 3b at least partially defines the inner surface 2c of the core 2. It shall be noted that the totality of the segments 3a, 3b defines the entire outer lateral surface 2a and the entire inner surface 2c of the core 2.

Figure 3A:
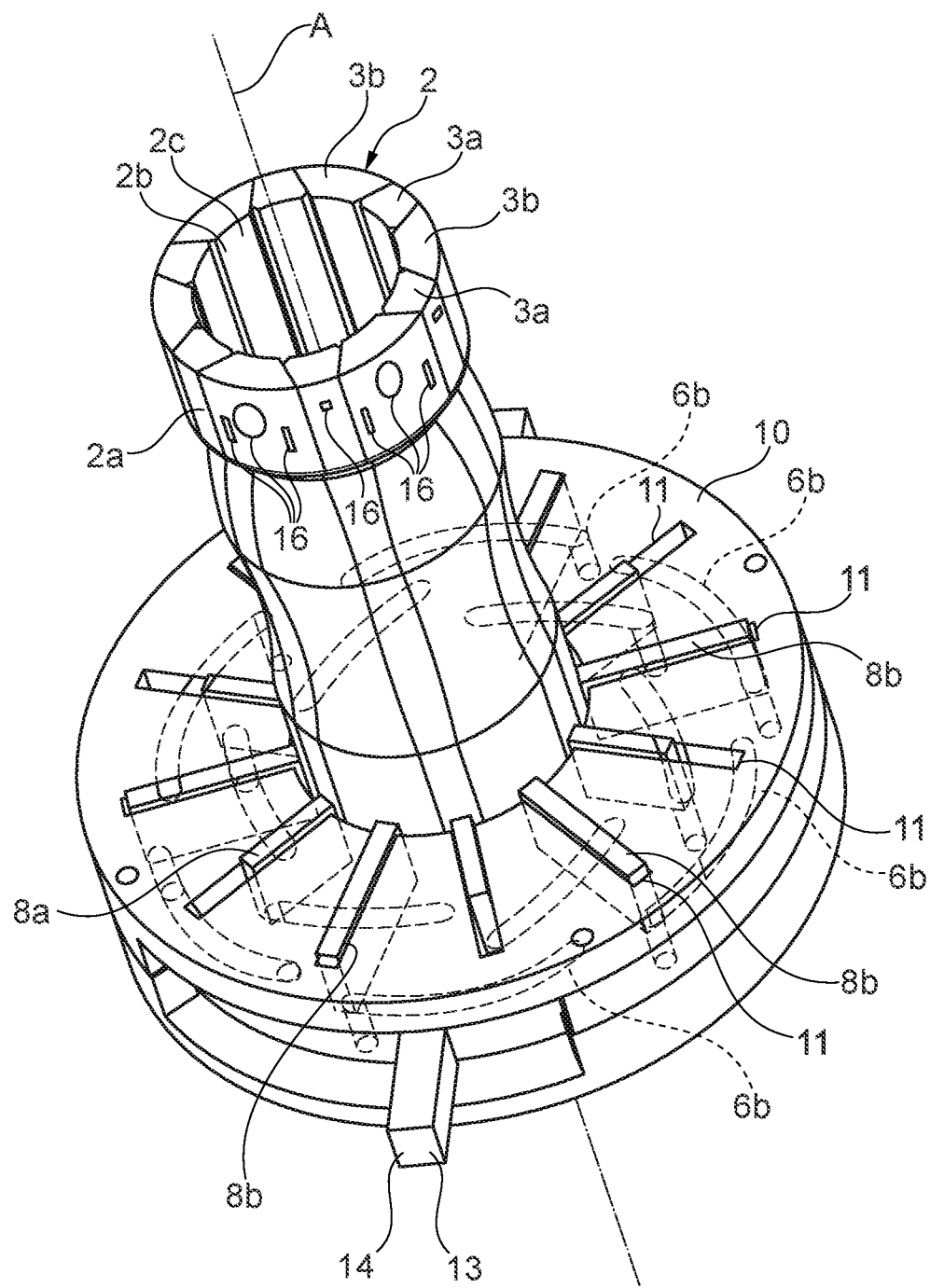
FIG. 3a is a perspective view of the device of FIGS. 1 and 2 in a machining configuration.

Particularly referring to FIG. 3a, it shall be noted that the core 2 comprises a first group of segments 3a and a second group of segments 3b. The segments 3a of the first group have a first shape, and the segments 3b of the second group have a second shape. It shall be noted that each segment 3a of the first group defines a portion of the outer lateral surface 2a of the core 2 that is smaller than a similar portion defined by a segment 3b of the second group.

It shall be noted that each segment 3a of the first group is placed between two segments 3b of the second group. Likewise, each segment 3b of the second group is placed between two segments 3a of the first group. In other words, the segments 3a, 3b of the first and the second groups are arranged in alternate relationship.

More in detail, each segment 3a, 3b has a pair of contact surfaces 5a, 5b with which it may contact with the segments 3a, 3b adjacent thereto. These contact surfaces 5a, 5b are substantially flat, and extend parallel to the center axis "A" along which the core 2 extends.

Figure 3B:
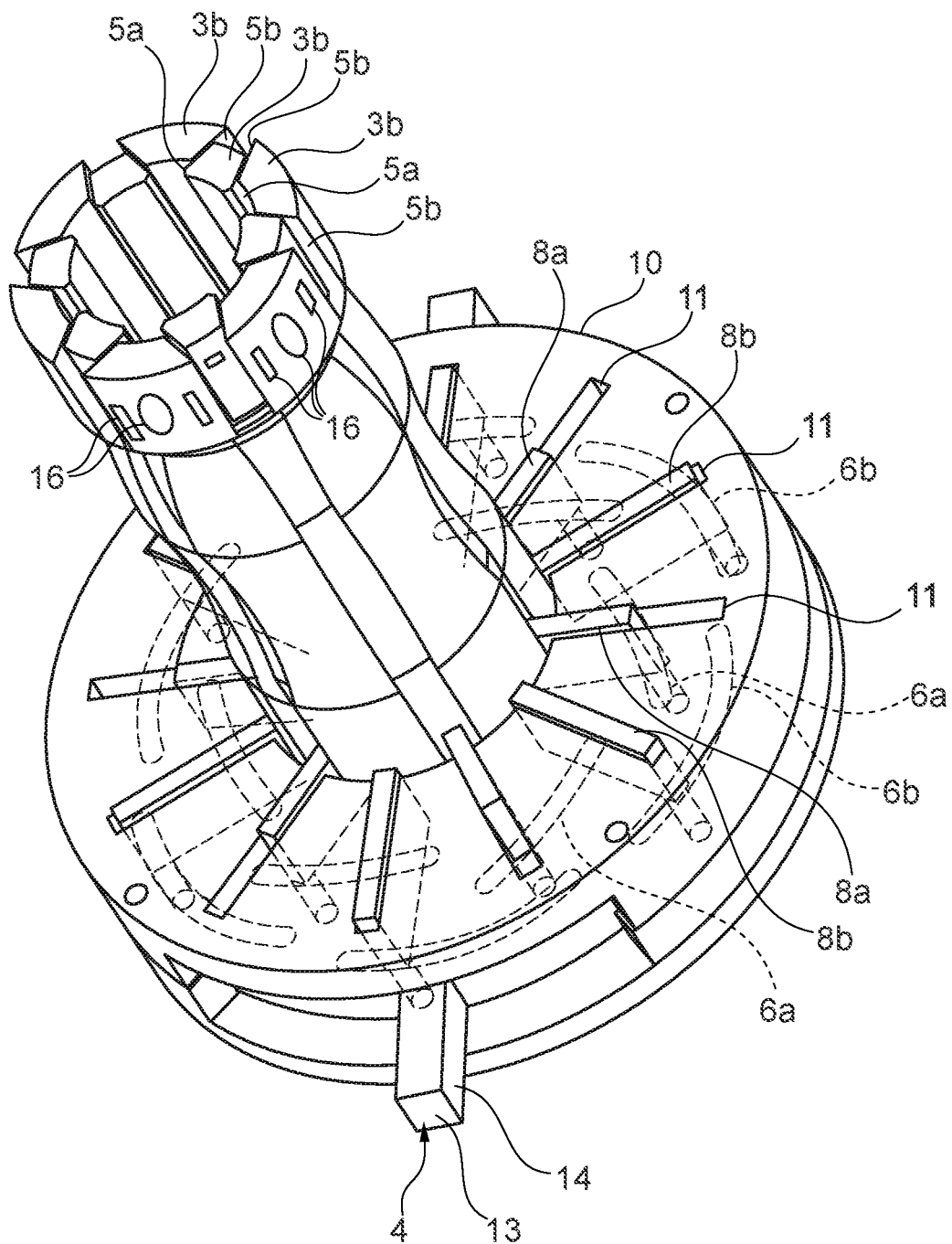
FIG. 3b is a perspective view of the device of FIGS. 1 and 2 during transition between the machining configuration and an extraction configuration.

Referring to FIG. 3b, it shall be noted that the contact surfaces 5a of the segments 3a of the first group diverge from the center axis "A" along which the core 2 extends. Likewise, the contact surfaces 5b of the segments 3b the second group converge toward the center axis "A" along which the core 2 extends.

It shall be noted that, in the illustrated embodiment, the number of the segments 3a of the first group is equal to the number of the segments 3b of the second group.

Figure 3C:
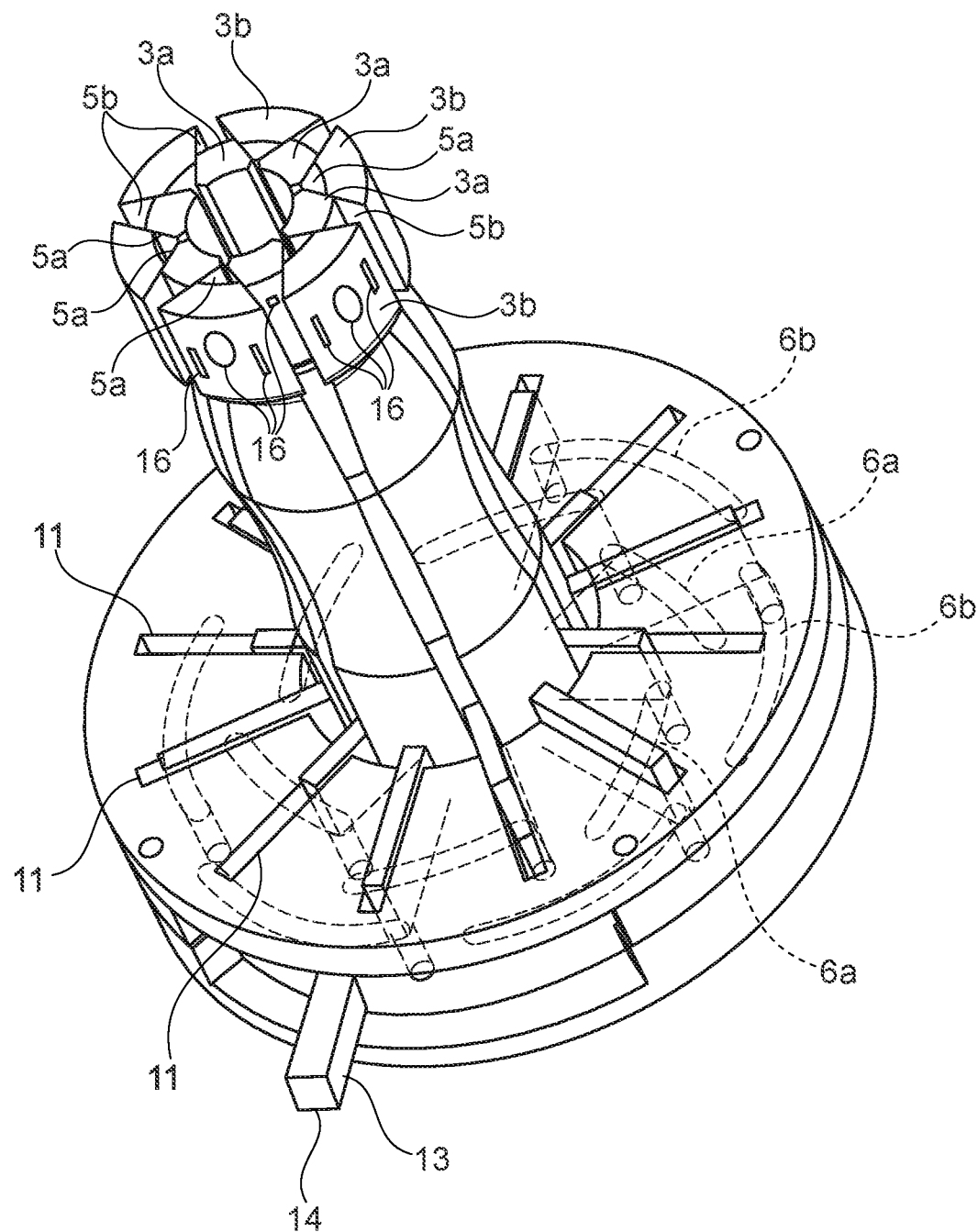
FIG. 3c is a perspective view of the device of FIGS. 1 and 2 in an extraction configuration.

According to the present invention, the segments 3 are arranged to move toward/away from the axis "A" along which the core 2 extends, as shown in particular in FIGS. 3a, 3b and 3c. More in detail, the segments 3 are adapted to be alternated between a machining configuration and an extraction configuration. In the machining configuration as shown for example in FIG. 3a, the segments 3 are locked together to prepare the core for a machining process. In the extraction configuration as particularly shown in FIG. 3c, the segments 3 are able to slide relative to each other to reduce the diameter of the core 2 and pull it out of the cavity.

It shall be noted that the segments 3a of the first group are arranged to move toward the longitudinal axis "A" before the segments 3b of the second group during transition from the machining configuration to the extraction configuration.

In order to switch the segments 3 at least from the machining configuration to the extraction configuration, the device 1 comprises the drive means 4 for moving the segments 3. In the preferred embodiment, the drive means 4 are also configured to move the segments 3 from the extraction configuration to the machining configuration. Advantageously, this may significantly speed up the production cycle operated by the device 1.

The drive means 4 particularly comprise a selector 9, which is configured to rotate the core 2. This selector 9 particularly has a circular shape, and is arranged to rotate about the center axis "A" along which the core 2 extends.

More in detail, the drive means 4 comprise a plurality of guides 6a, 6b and a plurality of cam followers 7, each connected to a respective segment 3a, 3b. The guides Ga, 6b are particularly formed on the selector 9. In particular, the guides 6a, 6b follow a curved path along the selector 9, i.e. having both a radial component and a tangential component. It shall be noted that the guides 6a, 6b are equally angularly spaced with respect to the center axis "A" along which the core 2 extends.

Each cam follower 7 fits in a respective guide 6a, 6b to be able to slide therein. Therefore, as a cam follower 7 slides in the guide 6a, 6b in which it fits, the segment 3a, 3b connected thereto will be displaced. Such sliding movement is caused by a rotation of the selector 9, as better shown hereinafter.

It should be further noted that the drive means 4 comprise first and second groups of guides 6a, 6b. The guides 6a of the first group are associated with the segments 3a of the first group. The guides 6b of the second group are associated with the segments 6b of the second group. It shall be noted that the guides 6a of the first group extend along a first curvilinear path. Likewise, the guides 6b of the second group extend along a second curvilinear path. The first and second curvilinear paths are different. Advantageously, this allows to move the segments 3a of the first group 3a differently from the segments 3b of the second group by a single rotation of the selector 9, since the cam followers 7 move along the profile of the guide 6a, 6b in which they fit.

With additional detail, in the embodiment as described herein, the guides 6a of the first group are arranged on the selector 9 inwards relative to the guides 6b of the second group. In certain alternative embodiments, not shown, this arrangement may be reversed.

More in detail, the drive means 4 comprise a plurality of connecting bars 8a, 8b. Each segment 3a, 3b is rigidly fixed to its cam followers 7 by means of a respective connecting bar 8a, 8b, particularly at opposite ends of this connecting bar 8a, 8b.

With further detail, the connecting bars 8a, 8b extend away from the outer surface 2a of the core 2. Each connecting bar 8a, 8b extends from its respective segment 3a, 3b in a direction that is substantially radial, i.e. substantially perpendicular to the center axis "A" along which the core 2 extends. It shall be noted that the connecting bars 8a associated with the segments 3a of the first group are shorter than the connecting bars 8b associated with the segments 3b of the second group, as the guides 6a of the first group are closer to the core 2 as compared with the guides 6b of the second group.

The device further comprises a plate 10 placed on the selector 9. This plate 10 has a substantially circular shape, which is particularly centered in particular on the center axis "A" along which the core 2 extends. The plate 10 is stationary, i.e. is does not rotate relative to the core 2. As shown for example in FIG. 1, the plate 10 has a plurality of radial through grooves 11.

Each groove 11 is placed at a respective segment 3a, 3b, such that the respective connecting bar 8a, 8b will fit in the corresponding groove 8a, 8b.

The cam followers 7 are able to slide relative to the grooves 11, and are particularly guided by the connecting bars 8a, 8b that are fixed thereto, to move toward/away from the center axis "A", by being driven by the rotation of the selector 9.

The selector 9 is able to rotate about the center axis "A" along which the core 2 extends, to thereby switch the segments 3 between the machining configuration and the extraction configuration. In particular, the drive means 4 comprise a control member 13 which is configured to continuously control displacement of the segments 3a, 3b between the machining and extraction configurations. In the illustrated embodiment, the control member 13 is embodied by a lever 14 that is fixed to the selector 9. In certain alternative embodiments, not shown, the control member 13 may be formed in any other manner among those known to the skilled person.

Whatever the mode of operation of the selector 9, its rotation relative to the plate 10 will cause the cam followers 7 to move in their respective guides 6a, 6b, i.e. in both tangential and radial directions relative to the selector 9. Since the cam followers are tangentially constrained by the grooves 11 in the plate 10 by means of the connecting bars 8a, 8b, they will move only relative to the plate 10 in the radial direction.

This movement is transferred to the segments 3a, 3b that form the core 2. In particular, the profiles of the guides 6a of the first group are arranged to first move the segments 3a of the first group and in doing so, to make room for movement of the segments 3b of the second group.

The above discussed device is advantageously employed in electromagnetic forming. For such machining process, the device 1 is arranged with the segments 3a, 3b in the machining configuration. Then, the component is placed on the mandrel, and electromagnetic forming is carried out, as is known in the art.

As the machining process has been completed, the mandrel 12 is pulled out first. Then, the segments 3a, 3b are moved from the machining configuration to the extraction configuration and later the core 2 is pulled out of the cavity of the component. The process may then be immediately repeated on a new component.

The invention claimed is:

1. A device for electromagnetic forming of components having a cavity with a longitudinal axis of extension, the device comprising:
   a core that extends along a central axis and is configured to be fitted into the cavity to carry out a forming operation on a component;
       wherein the core is configured to be pulled out of the cavity after the forming operation,
       wherein the core comprises a plurality of segments in parallel arrangement,
       wherein the segments are made of non-conductive material, and
       wherein the segments are configured to alternate between a machining configuration, in which the segments are locked together to prepare the core for a machining operation, and an extraction configuration, in which the segments mutually slide to reduce a diameter of the core and to remove the core from the cavity; and
   drive means for moving the segments, wherein the drive means is configured to alternate the segments between the machining configuration and the extraction configuration.

2. The device of claim 1, wherein the drive means comprises a control member which is configured to continuously control displacement of the segments between the machining and extraction configurations.

3. The device of claim 1, wherein the segments are configured to move toward/away from the center axis.

4. The device of claim 1, wherein the core comprises first and second groups of segments, and
   wherein the segments of the first group are configured to move toward the center axis before the segments of the second group, during transition from the machining configuration to the extraction configuration.

5. The device of claim 4, wherein each segment of the first group is between two segments of the second group, and
   wherein each segment of the second group is between two segments of the first group.

6. The device of claim 1, wherein the drive means comprises a plurality of guides and a plurality of cam followers, each slidingly fitting into a respective guide, and
   wherein each segment is connected to a respective cam follower.

7. The device of claim 6, wherein the drive means comprises first and second groups of guides,
   wherein the guides of the first group are associated with the segments of the first group, and
   wherein the guides of the second group are associated with the segments of the second group.

8. The device of claim 7, wherein the guides of the first group extend along a first curvilinear path, and
   wherein the guides of the second group extend along a second curvilinear path, differing from the first curvilinear path.

9. The device of claim 6, wherein the guides are at equal angular distances from the central axis.

10. The device of claim 6, wherein the drive means comprises a selector, which is coaxial with the core, and
    wherein the guides are formed on the selector.

11. The device of claim 10, wherein the selector is configured to rotate about the central axis to switch the segments between the machining configuration and the extraction configuration.

12. The device of claim 10, further comprising:
a plate overlapping the selector and having a plurality of radial grooves;
wherein the selector is configured to rotate relative to the plate, and
wherein the cam followers are configured to slide relative to the radial grooves to move away from/toward the central axis as guided by the rotation of the selector.

13. The device of claim 1, wherein the core has a seat, and wherein the device further comprises a mandrel configured to be fitted into/removed from the seat for stabilizing the core.

14. A method of electromagnetic forming of the components having a cavity of claim 1, the method comprising:
moving the segments into the machining configuration;
carrying out the electromagnetic forming on the component on the core;
moving the segments from the machining configuration to the extraction configuration; and
removing the core from the cavity.

15. The method of claim 14, wherein the component is a bottle closure.

16. A device for electromagnetic forming of components having a cavity with a longitudinal axis of extension, the device comprising:
a core that extends along a central axis and is configured to be fitted into the cavity to carry out a forming operation on a component;
wherein the core is configured to be pulled out of the cavity after the forming operation,
wherein the core comprises a plurality of segments in parallel arrangement,
wherein the segments are made of non-conductive material, and
wherein the segments are configured to alternate between a machining configuration, in which the segments are locked together to prepare the core for a machining operation, and an extraction configuration, in which the segments mutually slide to reduce a diameter of the core and to remove the core from the cavity; and
drive means for moving the segments, wherein the drive means is configured to move the segments from the machining configuration to the extraction configuration.

17. A device for electromagnetic forming of components having a cavity with a longitudinal axis of extension, the device comprising:
a core that extends along a central axis and is configured to be fitted into the cavity to carry out a forming operation on a component;
wherein the core is configured to be pulled out of the cavity after the forming operation,
wherein the core comprises a plurality of segments in parallel arrangement,
wherein the segments are made of non-conductive material, and
wherein the segments are configured to alternate between a machining configuration, in which the segments are locked together to prepare the core for a machining operation, and an extraction configuration, in which the segments mutually slide to reduce a diameter of the core and to remove the core from the cavity; and
drive means for moving the segments, wherein the drive means is configured to move the segments from the extraction configuration to the machining configuration.

* * * * *